UNITED STATES PATENT OFFICE.

PAUL R. SCHREURS AND GEORGE F. METZ, OF MUSCATINE, IOWA, ASSIGNORS TO THE PRESSLOID COMPANY, OF MUSCATINE, IOWA, A CORPORATION OF IOWA.

ARTIFICIAL PEARL.

1,252,849.  Specification of Letters Patent.  Patented Jan. 8, 1918.

No Drawing.  Application filed May 18, 1917. Serial No. 169,529.

*To all whom it may concern:*

Be it known that we, PAUL R. SCHREURS and GEORGE F. METZ, citizens of the United States, residing at Muscatine, in the county of Muscatine and State of Iowa, have invented certain new and useful Improvements in Artificial Pearl; and we hereby declare that the following is a full, clear, and exact description thereof.

The object of this invention is to produce a novel material which may be used for many purposes in the manufacturing arts, and as a substitute for bone, shell, celluloid, artificial ivory and hard rubber, and other natural and artificial substances used in manufactures, and which material may be molded or pressed into shape while in a plastic condition, or when thoroughly seasoned or hardened may be cut or machined into the desired shape.

A special object of the invention is to utilize the waste products of so called "pearl button" factories where the buttons are cut from "pearl" mussel shells, such as are commonly found in the Mississippi river and its tributaries, and from "pearl" shells found in the sea.

In making buttons from these shells, particularly from the fresh water shells, there is a great deal of coarse waste, which it has been attempted to utilize by breaking it up into small pieces for poultry grit; and there is also a great amount of very fine pearl shell dust or powder produced, which powder is very detrimental to health and exceedingly annoying and injurious to machinery, and a great deal of trouble has been experienced in disposing of this dust, which up to the present time is practically commercially worthless.

Our present invention utilizes such pearl shell waste and dust and by treating the same as hereinafter explained we produce therefrom a very valuable product which can be used for many purposes in the arts, and as a substitute for other materials above mentioned, and we convert the hitherto absolutely waste pearl dust or powder into a valuable commercial product.

In carrying out our invention we use the pearl shell dust and also utilize the pearl shell waste by reducing the latter to a fine powder and mix such powder with milk and calcium chlorid. This mixture is then thoroughly stirred until the mass is practically homogeneous; and it may be heated to evaporate excess moisture, and finally compressed by suitable means, and then allowed to season from say ten to twenty days' time, the time required depending upon the thickness of the mass or sheets into which the plastic mass is formed and the atmospheric conditions or temperature. When thoroughly seasoned the product will be hard, tough and durable.

If it be desired to tint the product a suitable pigment or coloring agent may be added to the mass at the time the components are being mixed, so that the product when finished will have the desired color.

If desired the mixture before being seasoned can be pressed into any desired form or articles and then allowed to harden.

We have found an excellent product can be produced by mixing one hundred pounds of pearl-shell powder, twenty pounds of milk, and two pounds of calcium chlorid, or its equivalent. Preferably the calcium chlorid is dissolved in the milk before the latter is mixed with the powder.

The said resultant product, when seasoned, is extremely hard and durable, and can be used for many purposes in the arts, in lieu of celluloid, real or artificial ivory, bone, hard rubber, and other compositions, and in many cases even in place of metal with advantageous results.

The product is not affected by heat and can be machined and polished. It can be used for insulating material, and as a substitute for porcelain articles; and has great durability and strength and is not fragile nor liable to fracture.

The proportions mentioned produce a most excellent product, but we do not consider the invention restricted to such particular proportions; they can be varied within the scope of the invention.

What we claim is:

1. A product comprising powdered pearl shell, milk, and calcium chlorid.

2. The herein described artificial product, comprising pearl shell powder, milk, and calcium chlorid, compressed and dried, substantially as described.

3. The herein described composition consisting of approximately 100 parts of pearl shell powder, 20 parts of milk, and 2 parts of calcium chlorid, substantially as specified.

In testimony that we claim the foregoing as our own we affix our signatures.

PAUL R. SCHREURS.
GEORGE F. METZ.